Patented Aug. 12, 1952

2,606,915

UNITED STATES PATENT OFFICE 2,606,915

CATALYTIC PROCESS FOR PREPARING AMIDES

Paul W. Garbo, Freeport, N. Y.

No Drawing. Application April 25, 1947, Serial No. 744,042

16 Claims. (Cl. 260—404)

This application is a continuation in part of the copending application, Serial No. 470,817, filed December 31, 1942, which has eventuated in U. S. Patent 2,419,831.

This invention relates to the production of primary amides of monocarboxylic acids having not less than 7 carbon atoms in the molecule.

The known methods of preparing amides by reacting ammonia with acid halides or anhydrides are expensive because of the high cost of the acid derivative used as raw material in the reaction. The reaction of the ammonia with carboxylic acids or esters is not characterized by good yields of amides when working with acids having not less than 7 carbon atoms in the molecule, say fatty acids of 10 to 18 carbon atoms.

More recently a process has been proposed whereby the monocarboxylic acids are converted to primary amides by reaction with urea instead of ammonia. While this proposal is meritorious in that it eliminates the use of ammonia and the attendant problems of handling this gas, it is not entirely satisfactory from the point of view of commercial operation. The slowness of reaction is a foremost detriment to the proposal. Furthermore, the amide yields are not particularly attractive.

Hereinafter when the term, compound, is used in expressions such as fatty acid compound, it will be understood that such expressions are used generically for both the acid and the corresponding ammonium salt.

A principal object of my invention is to accelerate the reaction of urea and monocarboxylic acid compounds containing not less than 7 carbon atoms in the molecule, in the production of the corresponding amides.

A further important object is to produce the amides of monocarboxylic acids of not less than 7 carbon atoms in the molecule with higher conversions than have heretofore been attainable through the use of urea as the amidizing reactant.

These and additional objects of my invention will be apparent from the description which follows.

I have discovered that the conversion of monocarboxylic acid compounds of not less than 7 carbon atoms in the molecule to the corresponding amides by reaction with urea is benefited by the presence in the reaction mass of one or more substances which apparently function as catalysts. Suitable catalysts are substances containing elements of Groups V and VI of the Mendeleeff Periodic System and having an atomic number between 15 and 92, inclusive. Representative catalysts are ammonium vanadate, bismuth sulfate, arsenious oxide, tungstic acid and sodium molybdate. Two or more catalysts may be used or the catalyst may be a compound of two or more active elements, e. g., selenium molybdate, ammonium phosphomolybdate and chromic ammonium sulfate. Catalysts containing the element phosphorus, particularly as a phosphate, or molybdenum, particularly as a molybdate, are preferred. Another group of suitable catalysts are substances containing the element boron, such as borax and sodium perborate; advantageously, boron catalysts are used in conjunction with one or more of the aforementioned catalysts either as separate compounds or as a joint compound, e. g., ammonium borotungstate. When the boron catalyst is used as a separate compound, boric acid is preferred. A particularly effective combination of catalysts is boric acid and a molybdate or a phosphate.

While the reaction of urea and the acid compound commences with the melting of the urea, i. e., at a temperature of about 130° C., higher temperatures are advisable. The reaction temperature is generally maintained within the range of about 150° to 280° C., and preferably in the range of about 170° to 230° C. It is advantageous to select a reaction temperature such that the reaction mass is kept in a fluid condition without reaching a stage where excessive foaming occurs.

The reaction mass including at least one catalyst is maintained in the heated fluid state until appropriate controls, say periodic analyses of the reaction mass, indicate that the reaction has reached a satisfactory stage of completion. When the reaction is terminated, the amide is recovered from the reaction mass by known procedures, for instance, solvent extraction, crystallization and vacuum distillation. The degradation products of urea, e. g., biuret and cyanuric acid, are also recoverable from the reaction mass and represent valuable by-products of the process.

It is advisable to employ at least 1 molecular equivalent of urea for each mol of monocarboxylic acid charged into the amidization reactor; preferably an excess of urea is used, 2 mols of urea for each mol of acid in general being very satisfactory. Inasmuch as the urea seems to act as a flux as well as a reagent for the reaction, large excesses of urea may be employed. However, from an economical point of view, a ratio of about 3 mols of urea to each mol of acid represents the normal upper limit of urea consumption. Where the starting material is the ammonium salt of the acid, somewhat smaller proportions of urea may be used. However, it is usually desirable not to reduce the above specified ratios by as much as 50% or more.

In some instances, in conducting the amidization it may be helpful to add to the reaction mass an inert fluidizing medium (a high boiling-point liquid) such as naphthalene, diphenyl methane, or a petroleum hydrocarbon fraction.

The several catalysts vary in their activity in promoting the amidization reaction but in general the amount of catalyst used will be in the range of about 0.1% to about 5.0% of the weight of the entire reaction mass.

Since the catalysts of this invention accelerate the amidization, a marked decrease in the reaction time is observed. Frequently, the catalyst reduces the reaction time by 20% to 50%; in some cases, the reaction time is decreased to less than one-half of the time required in the absence of the catalyst. Acceleration of amidization results often in additional benefits. Many of the amides are sensitive to elevated temperatures and continued exposure of these amides to the reaction temperatures at which they are formed tends to decompose or revert some of the produced amides back to the corresponding acids. Accordingly, a condition is encountered where it is impractical to convert to the amide more than a certain percentage, say 60% in the case of fatty acids of 10 to 18 carbon atoms in the molecule, of the starting compound. However, through the use of catalysts, it is now possible in some cases to drive the reaction further toward completion. Such higher conversions appear attributable to the catalytic acceleration of the desired amidization reaction and the consequent reduction in reaction time, which latter factor functions to diminish the opportunity for product amide to decompose or revert to the starting compound while the reaction mass is maintained at reaction temperature.

Another benefit of catalysts is that the reaction temperature may be lowered. Temperature reductions of the order of 10° to 25° C. are in several instances possible. Such decreases in reaction temperature also operate to diminish decomposition of the amide product and to facilitate the attainment of desirable high conversions. On the other hand, the presence of catalysts makes it also possible in some cases to increase the reaction temperature in the interests of very high reaction speeds; in such cases, the acceleration of the reaction caused by the catalysts so shortens the reaction time that the usual deleterious effects of increased temperature are counteracted by the shortened reaction time. It is therefore clear that the use of the catalysts of this invention permits the selection of temperatures for the amidization over a broader range than is feasible when the reaction between urea and monocarboxylic acid compounds is conducted in the absence of catalysts.

Obviously, the higher the conversion and the lower the decomposition of the amide product, the simpler and less costly is the recovery of the amide from the reaction mass. Under these circumstances, less unreacted material has to be recycled to the amidization reaction, less material is present to interfere with the separation of the amide in a state of high purity, and in general fewer or simpler recovery operations are necessitated. These additional benefits may be realized through the catalytic process of this invention.

The process of this invention is applicable to monocarboxylic acids and their ammonium salts containing not less than 7 carbon atoms, preferably 10 to 18 carbon atoms, in the molecule. The carbon atoms of the starting compound may be arranged in aliphatic, aromatic or naphthenic groupings. It is well to observe that the starting compound should be free of conjugated unsaturated bonds, alpha-beta unsaturation, and certain interfering groups or radicals such as hydroxyl, aldehyde, halogen, mercapto and sulfonic acid. Typical acids and their corresponding ammonium salts which can advantageously be converted to amides by the catalytic process of this invention include: capric, palmitic, stearic, linolinic, campholic, naphthoic, toluic, phenylacetic, benzoic and hexahydrobenzoic acids.

To illustrate the invention further, the following specific examples are given. The proportions are stated as parts by weight.

*Example 1*

A mixture of 300 parts of stearic acid, 150 parts of urea and 4 parts of diammonium acid phosphate is heated to a temperature of 195° C. The molten mass is agitated and maintained at this reaction temperature for 3 hours. Thereupon, the mass is extracted with hot toluene to recover the stearamide which may be purified by recrystallization. The yield of stearamide corresponds to 65% of the theoretical conversion.

Repeating the process of this example without using the catalyst, i. e., the diammonium acid phosphate, results in a conversion of only 35% to 40% of the stearic acid within the specified reaction period.

*Example 2*

A mixture of 120 parts of benzoic acid, 0.5 part of ammonium molybdate, 1 part of boric acid and 60 parts of 28% ammonia solution is strongly agitated and heated. Water is evaporated from the mixture with continued heating. When the temperature of the mass reaches 170° C., 100 parts of urea is added and the molten mass is kept at the reaction temperature for 1 hour. The benzamide thus produced corresponds to a conversion of 80% of that theoretically obtainable.

When the foregoing process is repeated with omission of the catalysts, ammonium molybdate and boric acid, an 80% conversion is difficult to obtain and in any case the reaction time must be prolonged to at least 2 hours.

Benefits similar to those indicated by the foregoing examples are realized when other catalysts of the invention, for instance, phosphomolybdic acid, sodium vanadate or ammonium borotungstate, are used. Under optimum conditions, it is possible with the aid of such catalysts to force the amidization reaction to a conversion level heretofore not obtainable.

Obviously, many modifications of the basic process of my invention will suggest themselves to those skilled in the art. Thus, because my catalysts accelerate the amidization reaction, it now becomes feasible to operate on a continuous basis. For instance, a molten mixture of a monocarboxylic acid compound of not less than 7 carbon atoms in the molecule and urea containing a catalyst of this invention is pumped through a heated tubular coil maintained at the desired reaction temperature; the time of travel of the molten material through the heated coil is adjusted so that the molten material discharges with a satisfactory content of amide. Also, the monocarboxylic acid compounds having not less than 7 carbon atoms in the molecule may be natural or synthetic products and may be utilized not only as isolated compounds but also as mixtures; for instance, a commercial mixture of cocoanut oil fatty acids may be subjected to the catalytic amidization process of this invention.

The foregoing description and examples are intended to be illustrative only. Variations of my invention conforming to its spirit are to be considered within the scope of the claims.

What I claim is:

1. The catalytic amidization process which comprises reacting a monocarboxylic acid compound of a hydrocarbon of not less than 7 carbon atoms, said hydrocarbon being selected from the class consisting of aliphatics, aromatics and naphthenics, with urea in the presence of an inorganic, oxygen-containing compound containing an element selected from Groups V and VI of the Mendeléeff Periodic System and having an atomic number between 15 and 92, inclusive, as catalyst, and recovering thus produced amide from the resulting reaction mass.

2. The catalytic amidization process which comprises reacting a monocarboxylic acid compound of a hydrocarbon of not less than 7 carbon atoms, said hydrocarbon being selected from the class consisting of aliphatics, aromatics and naphthenics, with urea in the presence of an inorganic, oxygen-containing compound of molybdenum as catalyst, and recovering thus produced amide from the resulting reaction mass.

3. The catalytic amidization process which comprises reacting a monocarboxylic acid compound of a hydrocarbon of not less than 7 carbon atoms, said hydrocarbon being selected from the class consisting of aliphatics, aromatics and naphthenics, with urea in the presence of an inorganic, oxygen containing compound of phosphorus as catalyst, and recovering thus produced amide from the resulting reaction mass.

4. The catalytic amidization process which comprises reacting a monocarboxylic acid compound of a hydrocarbon of not less than 7 carbon atoms, said hydrocarbon being selected from the class consisting of aliphatics, aromatics and naphthenics, with urea in the presence of inorganic, oxygen-containing compounds of molybdenum and boron as catalyst, and recovering thus produced amide from the resulting reaction mass.

5. The process of claim 4 wherein the molybdenum catalyst is ammonium molybdate and the boron catalyst is boric acid.

6. The catalytic amidization process which comprises reacting a monocarboxylic acid compound of a hydrocarbon of not less than 7 carbon atoms, said hydrocarbon being selected from the class consisting of aliphatics, aromatics and naphthenics, with urea in the presence of an inorganic, oxygen-containing compound of boron as catalyst, and recovering thus produced amide from the resulting reaction mass.

7. The catalytic process for producing stearamide, which comprises reacting a stearic acid compound with urea in the proportions of about 2 mols of urea for each mol of said compound in the presence of a molybdate catalyst, maintaining the reaction at a temperature in the range of about 170° to about 230° C., and recovering stearamide from the resulting reaction mass.

8. The catalytic process for producing stearamide, which comprises reacting a stearic acid compound with urea in the proportions of about 2 mols of urea for each mol of said compound in the presence of a phosphate catalyst, maintaining the reaction at a temperature in the range of about 170° to about 230° C., and recovering stearamide from the resulting reaction mass.

9. The continuous process for producing a fatty acid amide containing from 10 to 18, inclusive, carbon atoms in the molecule, which comprises mixing a fatty acid compound containing from 10 to 18, inclusive, carbon atoms in the molecule with molten urea in the proportions of about 2 mols of urea for each mol of said compound, adding a small quantity of an inorganic, oxygen-containing compound of molybdenum as catalyst to the resulting mixture, passing said mixture through a heated path, controlling the duration of said passage to effect substantial reaction between said compound and said urea, and recovering the thus produced fatty acid amide from the reaction mass issuing from said heated path.

10. The process of claim 9 wherein the fatty acid compound is a stearic acid compound and the molybdenum catalyst is ammonium molybdate.

11. The catalytic amidization process which comprises reacting a monocarboxylic acid compound of a hydrocarbon of not less than 7 carbon atoms, said hydrocarbon being selected from the class consisting of aliphatics, aromatics and naphthenics, with urea in the proportions of about 2 mols of urea for each mol of said compound in the presence of an inorganic, oxygen-containing compound containing an element selected from Groups V and VI of the Mendeléeff Periodic System and having an atomic number between 15 and 92, inclusive, as catalyst, maintaining the reaction at a temperature in the range of about 150° to about 280° C., and recovering thus produced amide from the resulting reaction mass.

12. The catalytic amidization process which comprises reacting a monocarboxylic acid compound of a hydrocarbon of not less than 7 carbon atoms, said hydrocarbon being selected from the class consisting of aliphatics, aromatics and naphthenics, with urea in the proportions of about 2 mols of urea for each mol of said compound in the presence of an inorganic, oxygen-containing compound of molybdenum as catalyst, maintaining the reaction at a temperature in the range of about 150° to about 280° C., and recovering thus produced amide from the resulting reaction mass.

13. The process of claim 1 wherein the monocarboxylic acid compound of a hydrocarbon of not less than 7 carbon atoms is a fatty acid compound containing from 10 to 18, inclusive, carbon atoms.

14. The process of claim 2 wherein the monocarboxylic acid compound of a hydrocarbon of not less than 7 carbon atoms is a fatty acid compound containing from 10 to 18, inclusive, carbon atoms.

15. The process of claim 3 wherein the monocarboxylic acid compound of a hydrocarbon of not less than 7 carbon atoms is a fatty acid compound containing from 10 to 18, inclusive, carbon atoms.

16. The process of claim 6 wherein the monocarboxylic acid compound of a hydrocarbon of not less than 7 carbon atoms is a fatty acid compound containing from 10 to 18, inclusive, carbon atoms.

PAUL W. GARBO.

REFERENCES CITED

The following references are of record in the file of this patent:

UNITED STATES PATENTS

| Number | Name | Date |
|---|---|---|
| 1,277,708 | Ellis | Sept. 3, 1918 |
| 1,989,968 | Bruson | Feb. 5, 1935 |
| 2,314,843 | Hultquist | Mar. 23, 1943 |
| 2,360,913 | Van Valkenburgh | Oct. 24, 1944 |
| 2,419,831 | Garbo | Apr. 29, 1947 |